(12) United States Patent
Ben Henda et al.

(10) Patent No.: US 12,273,711 B2
(45) Date of Patent: Apr. 8, 2025

(54) HOME CONTROLLED NETWORK SLICE PRIVACY

(71) Applicant: Telefonaktiebolaget LM Ericsson (publ), Stockholm (SE)

(72) Inventors: Noamen Ben Henda, Vällingby (SE); Henrik Normann, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 583 days.

(21) Appl. No.: 17/618,984

(22) PCT Filed: Jun. 16, 2020

(86) PCT No.: PCT/EP2020/066586
§ 371 (c)(1),
(2) Date: Dec. 14, 2021

(87) PCT Pub. No.: WO2020/254302
PCT Pub. Date: Dec. 24, 2020

(65) Prior Publication Data
US 2022/0312199 A1 Sep. 29, 2022

Related U.S. Application Data

(60) Provisional application No. 62/862,458, filed on Jun. 17, 2019.

(51) Int. Cl.
*H04W 12/06* (2021.01)
*H04W 12/03* (2021.01)
(Continued)

(52) U.S. Cl.
CPC ........... *H04W 12/06* (2013.01); *H04W 12/03* (2021.01); *H04W 12/041* (2021.01); *H04W 12/043* (2021.01); *H04W 48/18* (2013.01)

(58) Field of Classification Search
CPC ... H04W 12/06; H04W 12/03; H04W 12/041; H04W 12/043; H04W 48/18; H04W 12/037
See application file for complete search history.

(56) References Cited

U.S. PATENT DOCUMENTS

2007/0037553 A1* 2/2007 Patel ................... H04L 63/1466
455/410
2014/0003605 A1* 1/2014 Luft ....................... H04W 12/06
380/247
(Continued)

FOREIGN PATENT DOCUMENTS

CN 106717044 A 5/2017
CN 108880813 * 11/2018
(Continued)

OTHER PUBLICATIONS

"Discussion for drafting replay to S2-175309, relates NSSAI privacy", 3GPP TSG SA WG3 (Security) Meeting #88, Aug. 7-11, 2017 (Year: 2017).*
(Continued)

*Primary Examiner* — John B King
(74) *Attorney, Agent, or Firm* — Murphy, Bilak & Homiller, PLLC

(57) ABSTRACT

A wireless device (12) performs authentication (14) with a home network (10H) of the wireless device (12). The wireless device (12) encrypts a network slice identifier (24) with cryptographic key material (22) that is available from the authentication (14) with the home network (10H) and that is shared between the wireless device (12) and the home network (10H). The wireless device (12) transmits a message (20) that includes the encrypted network slice identifier (26). In some embodiments, a network node in a serving network (10S) of the wireless device (12) receives the message (20) and decrypts, or requests decryption of, the
(Continued)

encrypted network slice identifier (26) using cryptographic key material (22) that is available to the wireless device (12) from authentication (14) of the wireless device (12) with the home network (10H) and that is shared between the wireless device (12) and the home network (10H).

10 Claims, 19 Drawing Sheets

(51) Int. Cl.
*H04W 12/041* (2021.01)
*H04W 12/043* (2021.01)
*H04W 48/18* (2009.01)

(56) References Cited

U.S. PATENT DOCUMENTS

| | | | | |
|---|---|---|---|---|
| 2018/0270666 | A1* | 9/2018 | Lee | H04W 12/084 |
| 2019/0174449 | A1* | 6/2019 | Shan | H04W 60/04 |
| 2020/0145211 | A1* | 5/2020 | Lee | H04L 9/0825 |
| 2020/0145818 | A1* | 5/2020 | Lee | H04L 9/0869 |
| 2021/0289351 | A1* | 9/2021 | Ferdi | H04W 12/75 |

FOREIGN PATENT DOCUMENTS

| | | | |
|---|---|---|---|
| CN | 108880813 A | 11/2018 | |
| WO | 2018135524 A1 | 7/2018 | |
| WO | 2018137351 A1 | 8/2018 | |
| WO | WO-2018231125 A1 * | 12/2018 | ............ H04W 12/02 |
| WO | WO-2018236819 A1 * | 12/2018 | ............ H04W 12/02 |
| WO | 2019017689 A1 | 1/2019 | |
| WO | 2019088599 A1 | 5/2019 | |

OTHER PUBLICATIONS

3GPP, "3GPP TS 23.502 V15.5.1", 3rd Generation Partnership Project; Technical Specification Group Services and System Aspects; Procedures for the 5G System; Stage 2 (Release 15), Apr. 2019, 1-354.

3GPP, "3rd Generation Partnership Project; Technical Specification Group Services and System Aspects; 3GPP System Architecture Evolution (SAE); Security architecture (Release 15)", 3GPP TS 33.401 V15.8.0, Jun. 2019, 1-163.

3GPP, "3rd Generation Partnership Project; Technical Specification Group Services and System Aspects; Security architecture and procedures for 5G system (Release 15)", 3GPP Ts 33.501 V15.5.0, Jun. 2019, 1-190.

3GPP, "3rd Generation Partnership Project; Technical Specification Group Services and System Aspects; Security Aspects; Study on Security Aspects of Enhanced Network Slicing (Release 16)", 3GPP TR 33.813 V0.4.0, May 2019, 1-27.

Unknown, Author, "3rd Generation Partnership Project; Technical Specification Group Services and System Aspects; Security architecture and procedures for 5G system (Release 15)", 3GPP TS 33.501 V15.4.0, Mar. 2019, pp. 1-187.

Unknown, Author, "3rd Generation Partnership Project; Technical Specification Group Services and System Aspects; System Architecture for the 5G System; Stage 2 (Release 15)", 3GPP TS 23.501 V15.5.0, Mar. 2019, pp. 1-241.

* cited by examiner

HOME CONTROLLED NETWORK SLICE PRIVACY

TECHNICAL FIELD

The present application relates generally to a wireless communication network with one or more network slices and relates more specifically to network slice privacy in such a network.

BACKGROUND

A network slice is a logical network that provides specific network capabilities and network characteristics. An operator can deploy multiple network slices to provide different logical networks for providing different respective network capabilities and network characteristics. For example, different network slices may be dedicated to different respective services, such as Internet of Things (IoT) services, mission-critical services, mobile broadband services, etc. A single wireless device may be served with one or more network slices simultaneously via the access network. The wireless device in this regard may identify a network slice with which to be served, e.g., when it requests registration in or service from the network. The serving network can then select which network slice is to serve the wireless device based on that identity.

SUMMARY

Some embodiments herein encrypt the network slice identifier that the wireless device transmits, so as to confidentiality protect the network slice identifier. Some embodiments notably do so using cryptographic key material that is shared between the wireless device and the device's home network, and that is available from authentication of the device with the home network. Some embodiments thereby advantageously protect the network slice identifier using cryptographic key material that is bound to device authentication. These embodiments may limit the impact of the cryptographic key material being compromised, i.e., the key material will be refreshed after each authentication run. Moreover, shared between the device and the device's home network, the key material may advantageously remain more secure than if the key material were shared between the device and the device's serving network (which may differ from the home network). Alternatively or additionally, the home network may advantageously remain in control of the key material and/or privacy of the network slice identifier.

More particularly, embodiments herein include a method performed by a wireless device. The method comprises performing authentication of the wireless device with a home network of the wireless device. The method further includes encrypting a network slice identifier with cryptographic key material that is available from the authentication with the home network and that is shared between the wireless device and the home network. The method also includes transmitting a message that includes the encrypted network slice identifier.

In some embodiments, the method further comprises directly deriving the cryptographic key material from a key available from the authentication with the home network.

In some embodiments, the cryptographic key material includes a key dedicated for encrypting the network slice identifier.

In some embodiments, the home network is a 5G network, and the cryptographic key material includes, or is directly derived from, one or more of: a key $K_{AUSF}$ available from authentication of the wireless device with an Authentication Server Function, AUSF, of the home network; a Cipher key CK; an Integrity key IK; or an Extended Master Session Key, EMSK.

In some embodiments, the encrypted network slice identifier is included in an access stratum, AS, portion of the message. In other embodiments, the encrypted network slice identifier is included in a non-access stratum, NAS, portion of the message.

In some embodiments, the network slice identifier comprises Single Network Slice Selection Assistance Information, S-NSSAI.

Embodiments herein also include a method performed by a network node in a serving network of a wireless device. The method comprises receiving a message that includes an encrypted network slice identifier. The method also includes decrypting, or requesting decryption of, the encrypted network slice identifier using cryptographic key material that is available to the wireless device from authentication of the wireless device with a home network and that is shared between the wireless device and the home network.

In some embodiments, the serving network is a visited network of the wireless device. In this case, said decrypting or requesting comprises requesting decryption of the encrypted network slice identifier by transmitting to the home network a request that includes the encrypted network slice identifier. The method may further comprise receiving from the home network a response to the request that includes a decrypted network slice identifier.

In other embodiments, the serving network is the home network, and said decrypting or requesting comprises decrypting the encrypted network slice identifier. In some embodiments, the method further comprises selecting a network slice, or an access and mobility management function, AMF, to serve the wireless device based on the decrypted network slice identifier.

In some embodiments, the cryptographic key material is directly derived from a key available from the authentication of the wireless device with the home network.

In some embodiments, the cryptographic key material includes a key dedicated for encrypting the network slice identifier.

In some embodiments, the home network is a 5G network, and the cryptographic key material includes, or is directly derived from, one or more of: a key $K_{AUSF}$ available from authentication of the wireless device with an Authentication Server Function, AUSF, of the home network; a Cipher key CK; an Integrity key IK; or an Extended Master Session Key, EMSK.

In some embodiments, the encrypted network slice identifier is included in an access stratum, AS, portion of the message. In other embodiments, the encrypted network slice identifier is included in a non-access stratum, NAS, portion of the message.

In some embodiments, the network slice identifier comprises Single Network Slice Selection Assistance Information, S-NSSAI.

Embodiments herein further include a method performed by a network node in a home network of a wireless device. The method comprises receiving, from a serving network of the wireless device, a request to decrypt an encrypted network slice identifier. The method also comprises decrypting the encrypted network slice identifier using cryptographic key material that is available to the wireless device from authentication of the wireless device with a home network and that is shared between the wireless device and the home network. The method further comprises transmitting a response to the request that includes a decrypted network slice identifier obtained from said decrypting.

In some embodiments, the method further comprises directly deriving the cryptographic key material from a key available from the authentication of the wireless device with the home network.

In some embodiments, the cryptographic key material includes a key dedicated for encrypting the network slice identifier.

In some embodiments, the home network is a 5G network, and the cryptographic key material includes, or is directly derived from, one or more of: a key $K_{AUSF}$ available from authentication of the wireless device with an Authentication Server Function, AUSF, of the home network; a Cipher key CK; an Integrity key IK; or an Extended Master Session Key, EMSK.

Embodiments herein moreover include corresponding apparatuses, computer programs, and carriers of those computer programs. For example, embodiments herein include a wireless device, e.g., comprising communication circuitry and processing circuitry. The wireless device is configured to perform authentication of the wireless device with a home network of the wireless device. The wireless device is also configured to encrypt a network slice identifier with cryptographic key material that is available from the authentication with the home network and that is shared between the wireless device and the home network. The wireless device is further configured to transmit a message that includes the encrypted network slice identifier.

Embodiments herein also include a network node in a serving network of a wireless device. The network node is configured to receive a message that includes an encrypted network slice identifier. The network node is also configured to decrypt, or request decryption of, the encrypted network slice identifier using cryptographic key material that is available to the wireless device from authentication of the wireless device with a home network and that is shared between the wireless device and the home network.

Embodiments herein further include a network node in a home network of a wireless device. The network node is configured to receive, from a serving network of the wireless device, a request to decrypt an encrypted network slice identifier. The network node is also configured to decrypt the encrypted network slice identifier using cryptographic key material that is available to the wireless device from authentication of the wireless device with a home network and that is shared between the wireless device and the home network. The network node is further configured to transmit a response to the request that includes a decrypted network slice identifier obtained from said decrypting.

DETAILED DESCRIPTION

Figure 1:
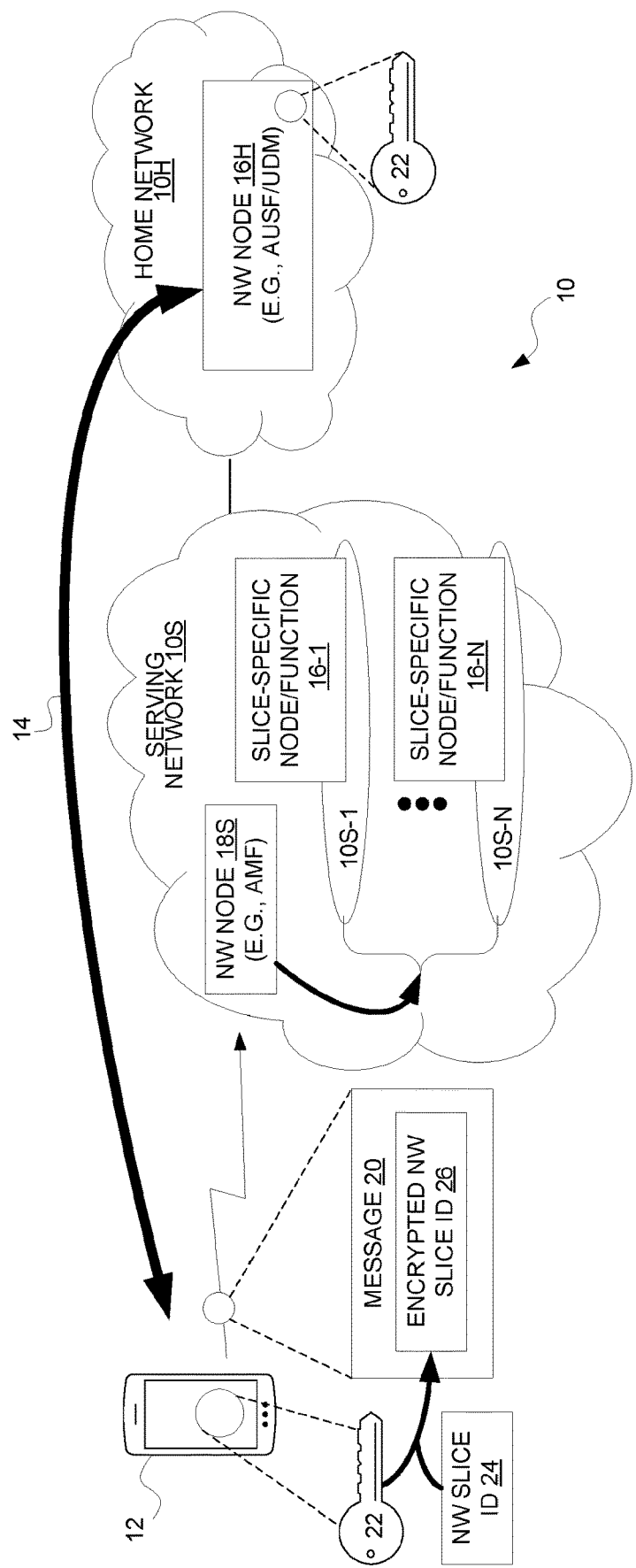
FIG. 1 is a block diagram of a serving network and a home network of a wireless device according to some embodiments.

FIG. 1 shows a wireless communication system 10 according to some embodiments. The system 10 provides wireless communication services to a wireless device 12 (e.g., a user equipment). The wireless device 12 in this regard is associated with a subscription to a home network 10H, e.g., via an integrated circuit card included in or embedded in the wireless device 12. To receive service, then, the wireless device 12 performs authentication 14 with the home network 10H. Such authentication 14 may involve for instance the wireless device 12 transmitting credentials towards the home network 10H and the home network 10H determining whether those credentials are valid for receiving the requested service. In some embodiments, the authentication is referred to as primary authentication, to differentiate the authentication from any secondary authentication of the wireless device 12 with data networks outside of the wireless communication network domain. The authentication 14 may for instance be performed by a network node 16H in the home network 10H as shown in FIG. 1. The network node 16H may for instance implement an Authentication Server Function (AUSF) and/or a Unified Data Management (UDM) function where the home network 10H is a 5G network.

After authentication 14 with the home network 10H, the wireless device 12 may be served by a serving network 10S. In some embodiments, the serving network 10S is the same as the home network 10H. In other embodiments, though, the serving network 10S is a visited network that differs from the home network 10H. In either case, the serving network 10S may comprise N network slices 10S-1 . . .

10S-N. Each network slice 10S-1 . . . 10S-N is a logical network that provides specific network capabilities and network characteristics. As shown in FIG. 1, for instance, the network slices may have respective slice-specific nodes or functions dedicated to serving those slices. In some embodiments, each network slice may include a slice-specific Access and Mobility Function (AMF), Session Management Function (SMF), and User Plane Function (UPF).

To serve the wireless device 12 with the appropriate network capabilities and characteristics (e.g., appropriate for the type of service requested by the wireless device 12), the serving network 10S may select from among the network slices 10S-1 . . . 10S-N a network slice to serve the wireless device 12. This may involve for instance selecting a network node/function 16-1 . . . 16-N to serve the wireless device 12. Regardless, the wireless device 12 according to some embodiments assists the serving network 10S with network slice selection by identifying the network slice that is or is to serve the wireless device 12. In these and other circumstances, then, the wireless device 12 may transmit a message to the serving network 10S that includes a network slice identifier. The network slice identifier may for instance be a Single-Network Slice Selection Assistance Information (S-NSSAI) in a 5G network.

The wireless device 12 according to embodiments herein encrypts a network slice identifier that the wireless device 12 transmits in a message, so as to confidentiality protect that network slice identifier. FIG. 1 in this regard shows that the wireless device 12 exploits cryptographic key material 22 for this purpose. The cryptographic key material 22 is notably available from the authentication 14 of the wireless device 12 with the home network 10H, and is shared between the wireless device 12 and the home network 10H. The wireless device 12 encrypts a network slice identifier 24 (e.g., S-NSSAI) with the cryptographic key material 22, in order to obtain an encrypted network slice identifier 26. The wireless device 12 then transmits a message 20 (e.g., a registration request message or a service request message) that includes the encrypted network slice identifier 26.

If the serving network 10S is the same as the home network 10H (i.e., the wireless device 12 is being served by its home network 10H), the serving network 10S may decrypt the encrypted network slice identifier 26 using the cryptographic key material 22. If the serving network 10S is different than the home network 10H, though, such that the serving network 10S is a visited network, the serving network 10S according to some embodiments requests the home network 10H to decrypt the encrypted network slice identifier 26. That is, the serving network 10S in some embodiments transmits to the home network 10H a request that includes the encrypted network slice identifier 26, and receives from the home network 10H a response to the request that includes a decrypted network slice identifier.

In some embodiments, such as where the message 20 is a registration request, the encrypted network slice identifier 26 is included in an access-stratum (AS) part of the message 20. In these and other cases, a radio network node in the serving network 10S may select, based on the decrypted network slice identifier, which network slice (e.g., AMF) to forward a non-access stratum (NAS) part of the message.

In other embodiments, the encrypted network slice identifier 26 may be included in a NAS part of the message 20. In this case, the message may be received by a core network node which may then select, based on the decrypted network slice identifier, which network slice (e.g., AMF) to forward the message 20 to.

Figure 2:
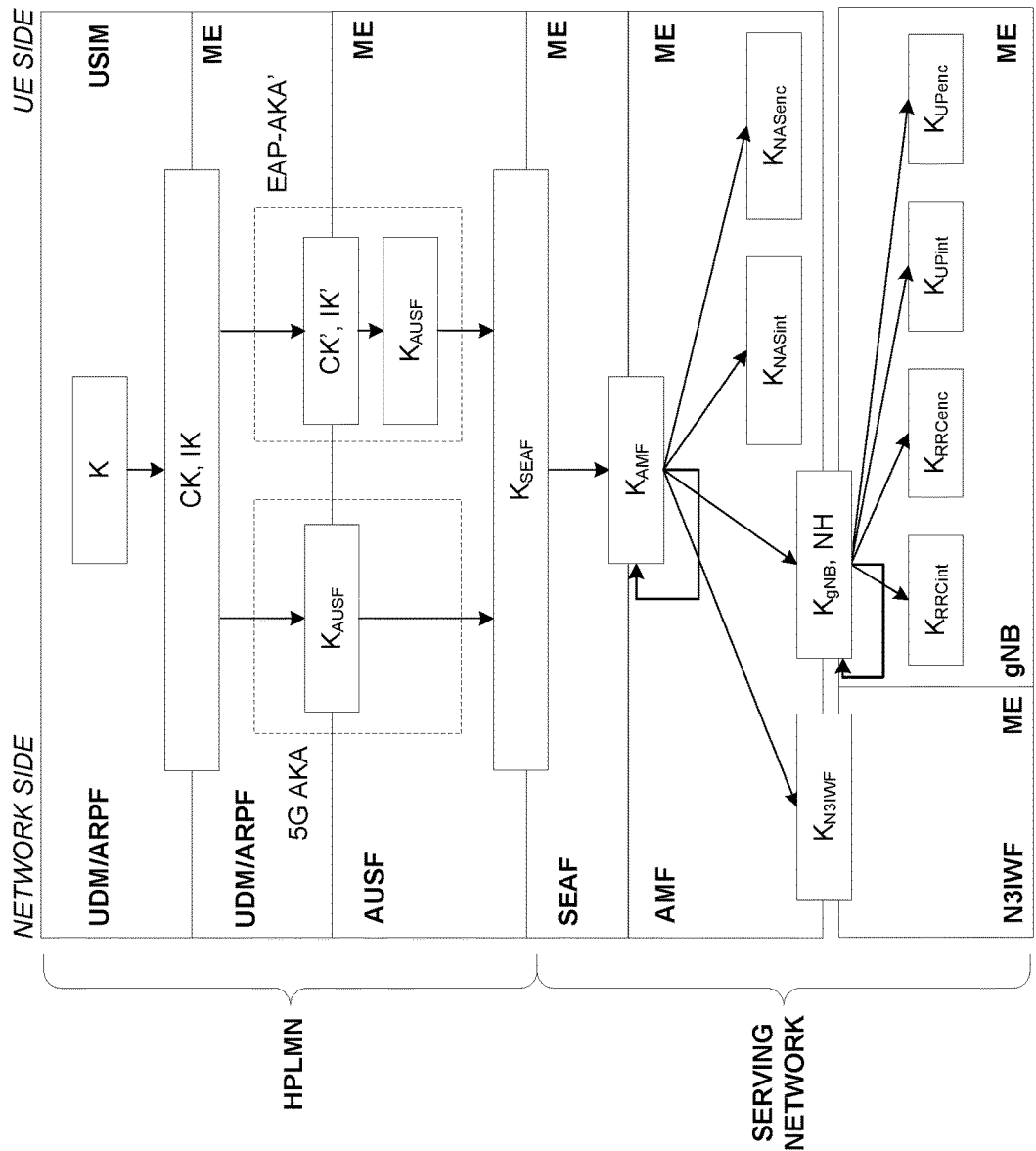
FIG. 2 is a block diagram of key hierarchy generation in a 5G system according to some embodiments.

FIG. 2 illustrates a key hierarchy established according to authentication 14 according to some 5G embodiments. In some embodiments, the cryptographic key material 22 is, or is derived directly from, any key shared between the home network 10H (as represented by the HLPMN in FIG. 2). This includes for instance the keys CK, IK, $K_{AUSF}$, CK', or IK' in the key hierarchy. In other embodiments not shown, the cryptographic key material 22 is or is derived directly from an Extended Master Session Key (EMSK).

In some embodiments, the cryptographic key material 22 includes a key (e.g., $K_{NSSAI}$) dedicated for encrypting the network slice identifier.

Some embodiments herein may be applied in a serving network 10S that is a 5G network. The 5G System includes many new features that require the introduction of new security mechanisms. See, e.g., 3GPP TS 33.501 v15.4.0. For example, the 5G System integrates non-3GPP access (e.g. Wireless Local Area Network, WLAN) alongside 3GPP access (New Radio, NR, and Long Term Evolution, LTE) in a seamless manner. More precisely, in 5G, the user equipment (UE) as an example of the wireless device 12 in FIG. 1 can run the usual service access procedure independently of the underlying access.

Figure 3:
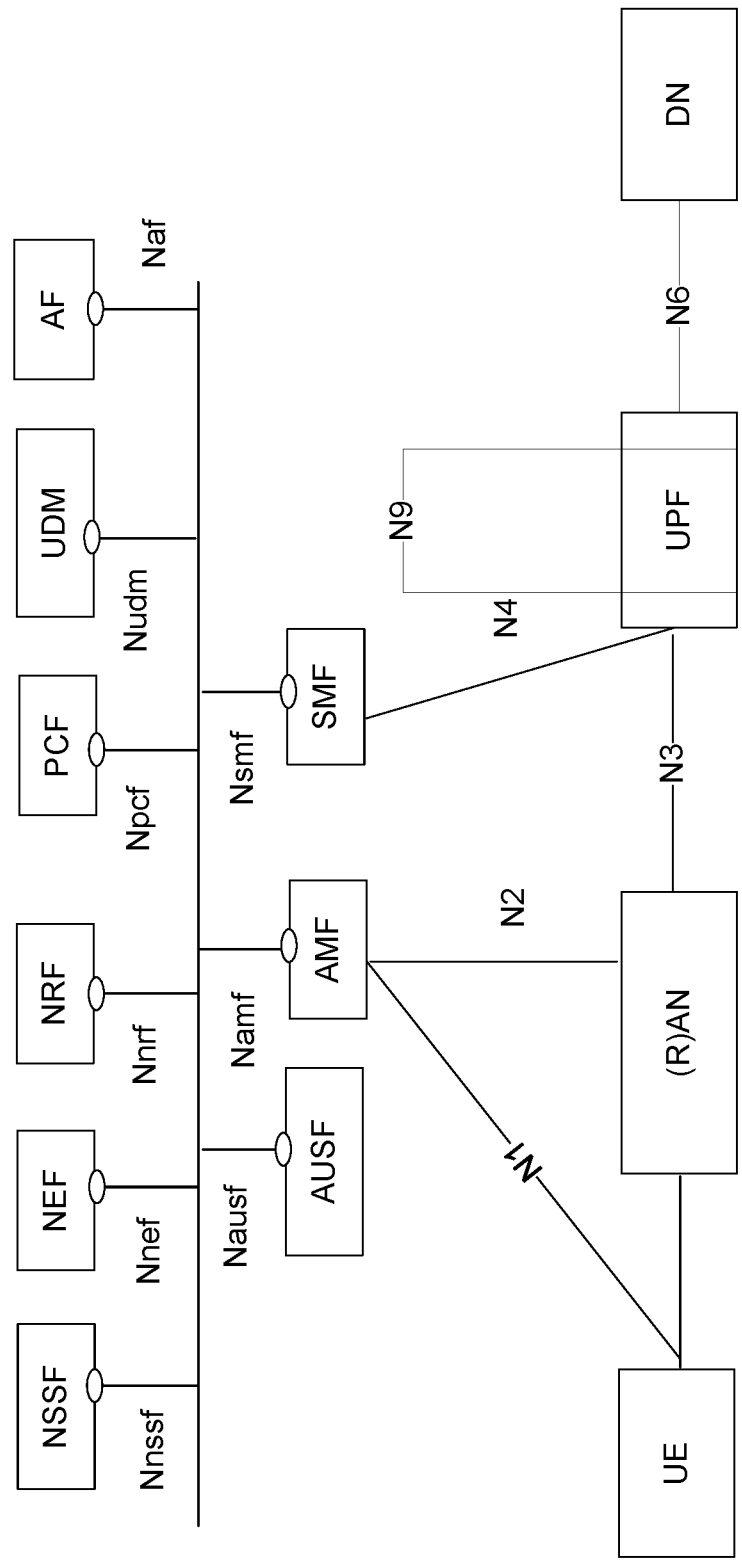
FIG. 3 is a block diagram of a 5G network according to some embodiments.

More particularly, the 5G System consists of the Access network (AN) and the Core Network (CN). The AN in the 5G System is the network that allows the UE to gain connectivity to the CN, e.g. the base station which could be a gNB or an ng-eNB in 5G. The CN in 5G is referred to as the 5G Core (5GC). The 5GC contains all the Network Functions (NF) ensuring a wide range of different functionalities such as session management, connection management, charging, authentication, etc. FIG. 3 gives a high-level overview of the 5G architecture for the non-roaming scenario.

The communication links between the UE and the network (AN and CN) can be grouped in two different strata. The UE communicates with the CN over the Non-Access Stratum (NAS), and with the AN over the Access Stratum (AS). All the NAS communication takes place between the UE and the Access and connectivity Management Function (AMF) in the CN over the NAS protocol (N1 interface in FIG. 3). Protection of the communications over these strata is provided by the NAS protocol (for NAS) and the Packet Data Convergence Protocol (PDCP) protocol (for AS).

In general, the security mechanisms for these protocols rely on multiple different security keys. In the 5G security specification, these keys are organized in the hierarchy shown in FIG. 2. At the top level there is the long-term key part of the authentication credential that is stored in the Subscriber Identity Module (SIM) card on the UE side and in the Unified Data Management (UDM)/Authentication Credential Repository and Processing Function (ARPF) on the Home Public Land Mobile Network (PLMN) side.

A successful Primary Authentication run between the UE and the Authentication Server Function (AUSF) in the Home Public Land Mobile Network (PLMN) leads to the establishment of the $K_{AUSF}$ key, which is the second level key in the hierarchy. This key is not intended to leave the Home PLMN and is used for new features introduced in the 5G System, such as for the provisioning of parameters to the UE from the Home PLMN. More precisely the $K_{AUSF}$ key is used for the integrity protection of the messages delivered from the Home PLMN to the UE. As described in 3GPP Technical Specification (TS) 33.501 v15.4.0, such new features include the Steering of Roaming (SoR) and the UDM parameter delivery procedures.

The $K_{AUSF}$ is used to derive another key that is sent to the serving PLMN ($K_{SEAF}$). The serving PLMN key is then used to derive the subsequent NAS and AS protection keys. These lower level keys together with other security parameters such as the cryptographic algorithms, the UE security capabilities, the value of the counters used for replay protection in the different protocols, etc., constitute what is defined as the 5G security context, e.g., in TS 33.501 v15.4.0. It should be noted that $K_{AUSF}$ is not part of the 5G security context since 5G security context resides in the serving network.

One of the new features introduced in the 5G System is Network Slicing. This feature allows the operators to better manage their networks and tune their resources depending on the type of service. Roughly, in the context of 5G, a Network Slice is a group of Network Functions (e.g., in the core network) (typically an AMF, SMF and UPF) that is dedicated to a specific service, e.g. IoT, Mission Critical, Mobile Broadband (MBB), etc.

A Network Slice in 5G is identified by a Single Network Slice Selection Assistance Information (S-NSSAI), as an example of a network slice identifier 24 in FIG. 1. In some embodiments, an S-NSSAI is comprised of: (i) a Slice/Service type (SST), which refers to the expected Network Slice behaviour in terms of features and services; and (ii) a Slice Differentiator (SD), which is optional information that complements the Slice/Service type(s) to differentiate amongst multiple Network Slices of the same Slice/Service type. During the registration procedure, the UE (as an example of the wireless device 12 in FIG. 1) may provide a collection of S-NSSAIs referred to as NSSAI so that the network can select the proper slice for serving the UE.

In particular, based on the Requested NSSAI (if any) and the Subscription Information, the 5GC is responsible for selection of a Network Slice instance(s) to serve a UE including the 5GC Control Plane and User Plane Network Functions corresponding to the Network Slice instance(s). The (R)AN may use the Requested NSSAI in access stratum signalling to handle the UE Control Plane connection before the 5GC informs the (R)AN of the Allowed NSSAI. The Requested NSSAI is used by the RAN for AMF selection. When a UE is successfully registered over an Access Type, the CN informs the (R)AN by providing the Allowed NSSAI for the corresponding Access Type. More details on the Network Slicing concept can be found in clause 5.18 of TS 23.501 v15.5.0.

The NSSAI is sensitive since it can disclose information on the type or the usage of UE, for example a police UE. Due to this, the NSSAI should be confidentiality protected.

Now the NSSAI is typically included in the Registration Request message from the UE during the Registration procedure. In addition, the NSSAI can be included in the NAS layer (NAS protocol message) or the AS layer (RRC message). For the case where the NSSAI is to be included in the NAS layer, the initial NAS protection feature is mandatory to use. This feature described in TS 33.501 v15.5.0 mandates that any sensitive information is included in a ciphered container within the initial NAS message. If NAS security is not established yet, then any sensitive information must be sent after NAS security establishment.

Heretofore, for the case where the NSSAI is to be sent on the AS layer, the default behavior of the UE is that NSSAI is never included in the AS layer unless the home network configures the UE to do so. As a consequence, for sensitive slices the home network simply does not do anything, while for non-sensitive slices the network can configure the UE using the procedure specified in TS 23.502 v5.5.1 to include the NSSAI in the AS layer. The problem here is that including the NSSAI on the AS layer only when the NSAAI is non-sensitive would not really provide confidentiality protection of that information but rather would just allow disclosure of the information in case it is non-sensitive. That per se can be seen as some kind of information disclosure.

A new mechanism for the protection of the NSSAI at the AS should be introduced for the next release of TS 33.501 (Release 16).

One solution for protecting the NSSAI would be to protect the NSSAI using the same key as that with which the subscription permanent identifier (SUR) is protected in the initial Registration Request message when the operator deploys the SUPI privacy mechanism. This key is a pre-provisioned home network key. In such case the serving network would forward the protected NSSAI to the home network which can decrypt and provide the clear text NSSAI back to the serving network. One problem with this solution, though, would be that it would use a pre-provisioned home network key, rather than using cryptographic key material available from an earlier authentication run or using an existing NAS or AS security context. See, e.g., TR 33.813 v0.4.0.

Another solution would be to use pseudonyms. Basically, a mapping between (actual S-NSSAIs) and pseudonym (or temporary) S-NSSAIs would be maintained in the network and the UE. When the UE would decide to include the NSSAI in the AS layer before security establishment then it would form the NSSAI using the temporary S-NSSAIs instead of the real ones. Now, depending on where the mapping is maintained, either the home or the serving network would use the received NSSAI to determine the real one and act on it accordingly. This solution however would not really provide the same level of security compared to encryption and would require special considerations to avoid linkability, by for example often changing the pseudonyms. This might consequently require additional signaling overhead to synchronize the mapping between the UE and the network. In addition, the solution would require a recovery mechanism in case the mapping is not synchronizing.

Certain aspects of the present disclosure and their embodiments may provide solutions to these or other challenges, e.g., in a way that avoids or mitigates the disadvantages of alternative solutions mentioned above for 5G. Some embodiments for example encrypt the NSSAI using a key that is available from an earlier authentication run and that is shared between the UE and the home network (not with the serving network).

Certain embodiments may provide one or more of the following technical advantage(s). Some embodiments provide the means to encrypt the NSSAI and thus deliver a better level of protection compared to the pseudonym-based solutions. Some embodiments do not require additional signaling overhead or any of the downfalls for maintaining a mapping between real and pseudonym S-NSSAIs. Some embodiments reuse security material that is available from and/or bound to the authentication run. Some embodiments give the home network the full control over the privacy of the NSSAI.

Figure 4:
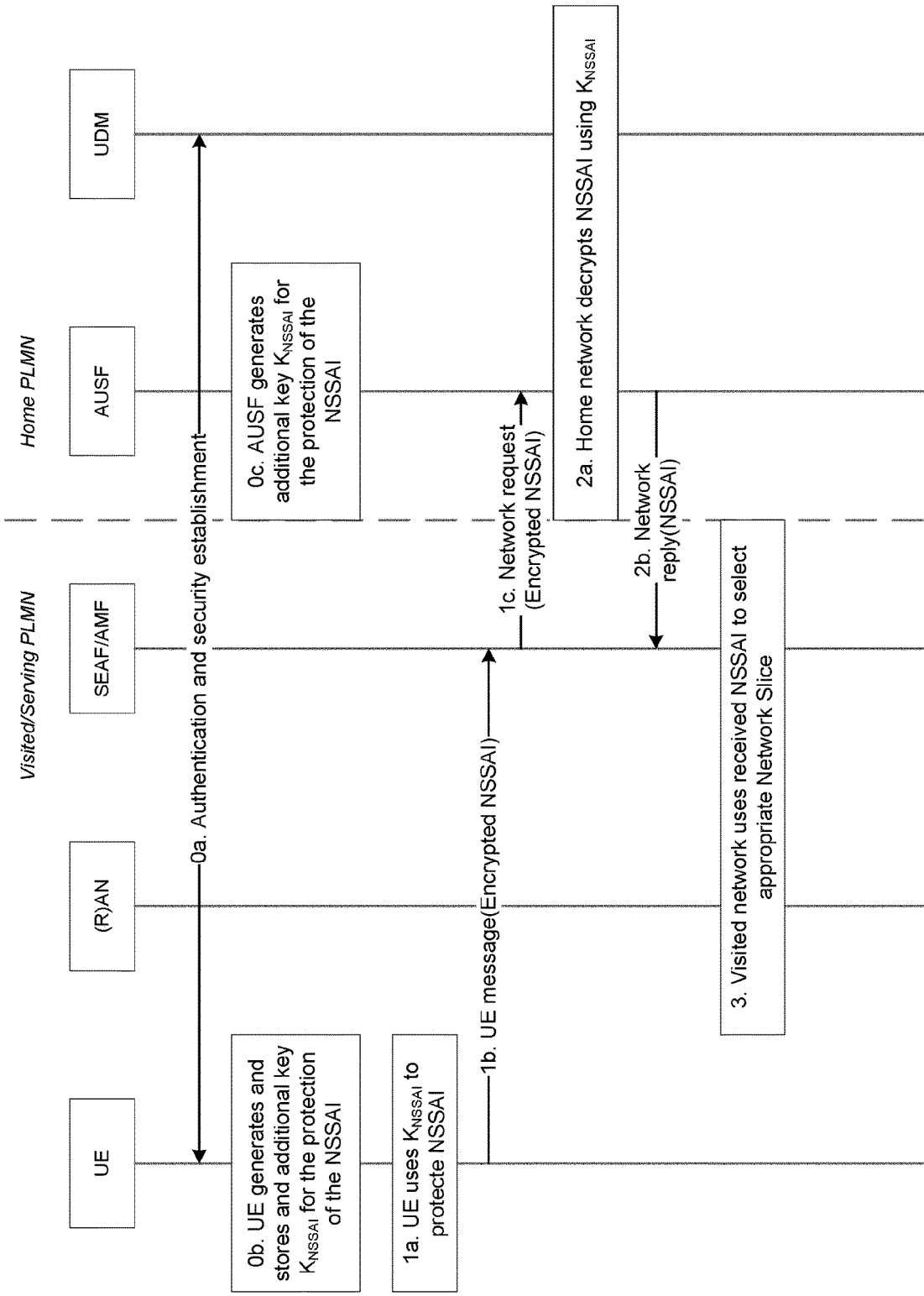
FIG. 4 is a call flow diagram for securing a network slice identifier in a 5G network according to some embodiments.

More particularly, some embodiments are based on the use of a key that results from the authentication procedure and that is shared between the UE and the home network for the encryption of the NSSAI information. FIG. 4 illustrates the steps to be undertaken by the UE and the network according to some embodiments. In FIG. 4, the UE is an example of the wireless device 12 in FIG. 1, the Visited/Serving PLMN is an example of the serving network 10S, and the Home PLMN is an example of the home network 10H. And, the NSSAI is an example of the network slice ID 24, the key $K_{NSSAI}$ is an example of cryptographic key material 22, and an encrypted $K_{NSSAI}$ is an example of the encrypted network slice ID 26.

In Step 0a, the UE registers and authenticates with the network as described in TS 33.501 v15.4.0. The authentication procedure is typically performed during initial registration when the UE is turned on or a new SIM card is inserted. Upon a successful authentication, the UE and the network in Steps 0b and 0c each generate and store an additional key, here called $K_{NSSAI}$ for the sole purpose of NSSAI encryption.

In one embodiment, the $K_{NSSAI}$ is derived from the $K_{AUSF}$ key using a new FC value and possibly other parameters in similar manner to how $K_{SEAF}$ is derived in Annex A.6 of TS 33.501 v15.4.0. In this regard, the $K_{NSSAI}$ may be derived from the $K_{AUSF}$ key via a key derivation function (KDF), where $K_{NSSAI}$=KDF(Key, S), with the Key being the $K_{AUSF}$ key.

More particularly, in some embodiments, input parameters and their lengths shall be concatenated into a string S as follows. The length of each input parameter measured in octets shall be encoded into a two octet-long string: (a) express the number of octets in input parameter Pi as a number k in the range [0, 65535]; and (b) Li is then a 16-bit long encoding of the number k. String S in some embodiments shall be constructed from n+1 input parameters as follows:

$$S=FC\|P0\|L0\|P1\|L1\|P2\|L2\|P3\|L3\| \ldots \|Pn\|Ln$$

where
  FC is used to distinguish between different instances of the algorithm and is either a single octet or consists of two octets of the form FC1∥FC2 where FC1=0xFF and FC2 is a single octet,
  P0 . . . Pn are the n+1 input parameter encodings, and
  L0 . . . Ln are the two-octet representations of the length of the corresponding input parameter encodings P0 . . . Pn.

In some embodiments, the following restriction applies to P0: P0 is a static ASCII-encoded string.

The final output, i.e. the derived key $K_{NSSAI}$ is equal to the KDF computed on the string S using the key, denoted Key. The following KDF may be used in some embodiments:

$$\text{derived key}=\text{HMAC-SHA-256}(Key, S)$$

where $K_{NSSAI}$ is the derived key and $K_{AUSF}$ is the Key.

In another embodiment, the $K_{AUSF}$ could act as $K_{NSSAI}$.

Regardless, the UE stores the key $K_{NSSAI}$ until the next authentication run or the security context is deleted. On the network side, the $K_{NSSAI}$ can be generated or otherwise derived by the AUSF or the UDM, with FIG. 4 showing the former case. In the case where the $K_{NSSAI}$ is derived from the $K_{AUSF}$ and the performed authentication procedure is 5G-AKA, then the $K_{NSSAI}$ can be derived by the UDM since in such case it is already the UDM that derives $K_{AUSF}$. In case the performed authentication procedure is EAP-AKA, then the $K_{AUSF}$ is calculated by the AUSF, and hence only the AUSF can calculate keys derived from $K_{AUSF}$. The $K_{NSSAI}$ can be stored in the AUSF or in the UDM alongside any other parameters pertaining to the authenticated UE.

In Step 1a, the UE at one point decides it wants to access a network slice and determines that it needs to signal NSSAI to the network. So, the UE encrypts the NSSAI using the $K_{NSSAI}$ key generated during the latest authentication procedure run and includes the encrypted NSSAI in a message to be transmitted. The encrypted payload is forwarded to the home network in Steps 1b and 1c, via the SEAF/AMF of the visited/serving PLMN, alongside any other information that allows identifying the UE or the corresponding used key. Such information could be the Subscription Permanent Identifier (SUR).

In Step 2a, the home network retrieves the $K_{NSSAI}$, for example based on the provided identifying information (ex. SUR) and uses it to decrypt the encrypted message, i.e., the encrypted NSSAI. Depending on where the $K_{NSSAI}$ is stored, either the AUSF or the UDM may perform the decryption, with FIG. 4 showing the former case. In Step 2b, the home network then replies to the visited network including the clear text NSSAI so as to return the decrypted NSSAI to the visited network.

In Step 3, the visited network can then proceed, based on the received NSSAI, with the selection of the appropriate Network Slice to serve the UE's request.

For the encryption of the NSSAI, one of the mandatory-to-support encryption algorithms described in Annex D.2 of TS 33.501 v15.4.0 could be used. Using such algorithms would simplify the deployment of some embodiments since the algorithms are already supported by any 5G capable UE. Specifically, some embodiments use a 128-bit ciphering algorithm as follows. The input parameters to the ciphering algorithm are a 128-bit cipher key named KEY, a 32-bit COUNT, a 5-bit bearer identity BEARER, the 1-bit direction of the transmission i.e. DIRECTION, and the length of the keystream required i.e. LENGTH. The DIRECTION bit shall be 0 for uplink and 1 for downlink.

Figure 5:
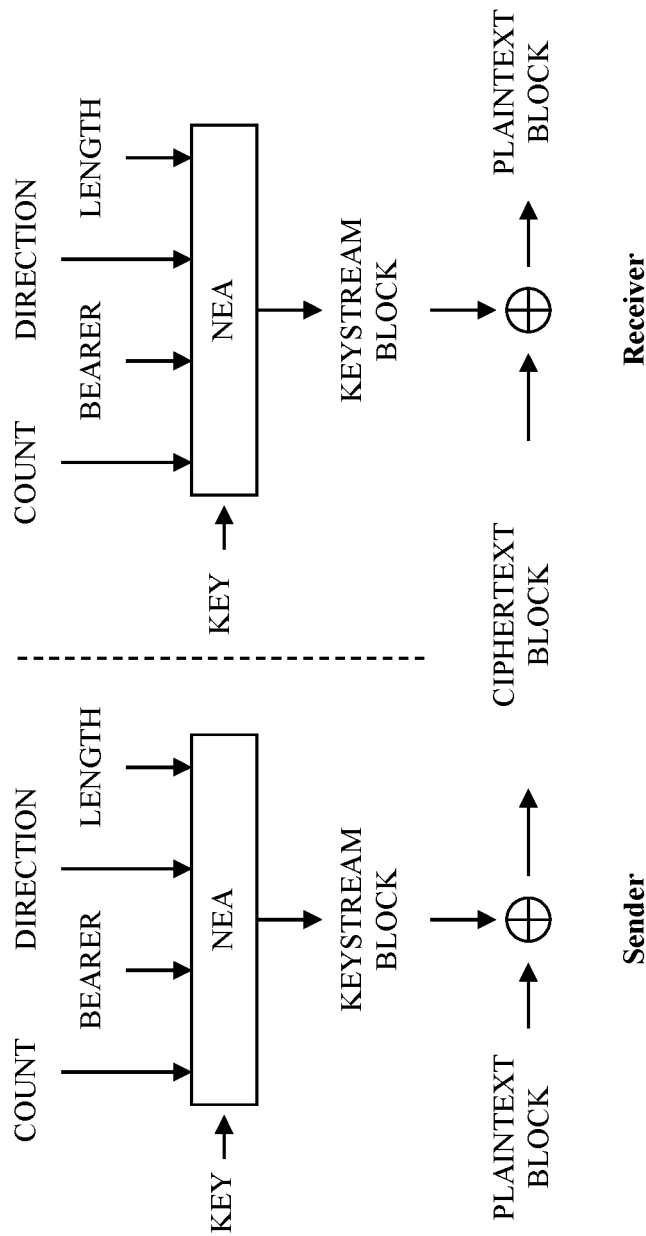
FIG. 5 is a block diagram of a ciphering algorithm for encrypting a network slice identifier according to some embodiments.

FIG. 5 illustrates the use of the ciphering algorithm NEA (Encryption Algorithm for 5G) to encrypt plaintext by applying a keystream using a bit per bit binary addition of the plaintext and the keystream. The plaintext may be recovered by generating the same keystream using the same input parameters and applying a bit per bit binary addition with the ciphertext.

Based on the input parameters, the algorithm generates the output keystream block KEYSTREAM which is used to encrypt the input plaintext block PLAINTEXT to produce the output ciphertext block CIPHERTEXT.

The input parameter LENGTH shall affect only the length of the KEYSTREAM BLOCK, not the actual bits in it.

Note that 128-NEA1 is identical to 128-EEA1 as specified in Annex B of TS 33.401 v15.8.0. 128-NEA2 is identical to 128-EEA2 as specified in Annex B of TS 33.401 v15.8.0. And 128-NEA3 is identical to 128-EEA3 as specified in Annex B of TS 33.401 v15.8.0.

Figure 6:
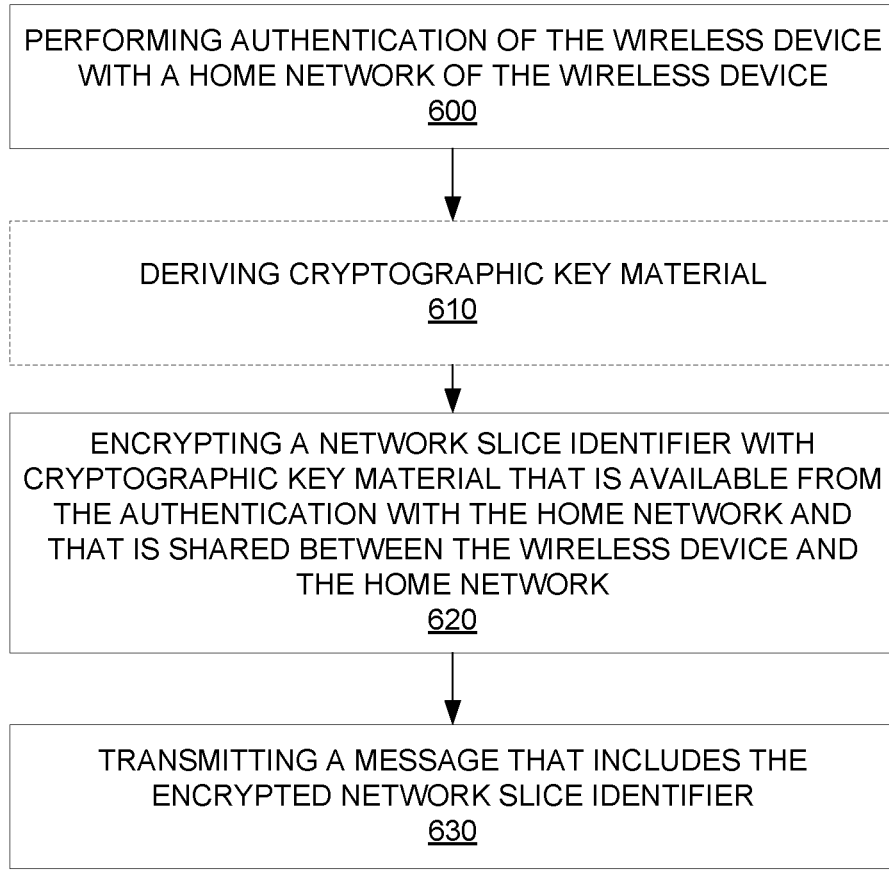
FIG. 6 is a logic flow diagram of a method performed by a wireless device according to some embodiments.

In view of the above modifications and variations, FIG. 6 depicts a method performed by a wireless device 12 in accordance with particular embodiments. The method includes performing authentication 14 of the wireless device 12 with a home network 10H of the wireless device 12 (Block 600). The authentication 14 may for instance be primary authentication. The method may further include encrypting a network slice identifier 24 (e.g., NSSAI) with cryptographic key material 22 that is available from the authentication 14 with the home network 10H and that is shared between the wireless device 12 and the home network 10H (Block 620). The method in some embodiments also includes transmitting a message 20 that includes the encrypted network slice identifier 26 (Block 630).

In some embodiments, the method further comprises deriving the cryptographic key material 22 (Block 620). For example, this may entail directly deriving the cryptographic key material 22 from a key $K_{AUSF}$ available from the authentication with the home network 10H.

Figure 7:
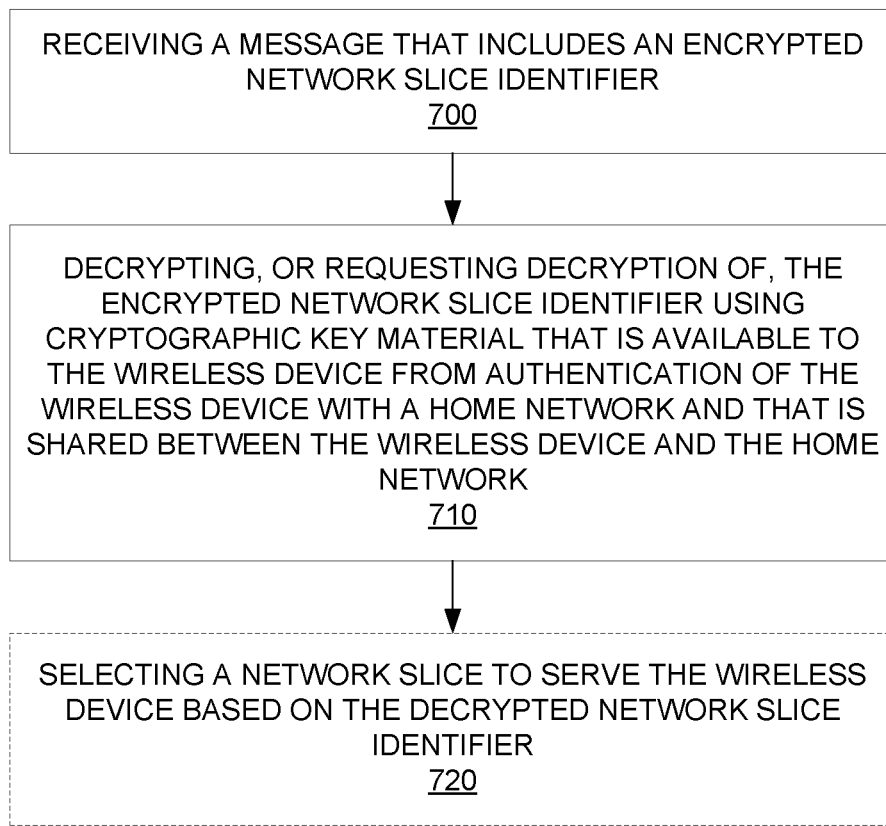
FIG. 7 is a logic flow diagram of a method performed by a network node in a serving network of a wireless device according to some embodiments.

FIG. 7 depicts a method performed by a network node 18S in a serving network 10S of a wireless device 12 in accordance with other particular embodiments. The method includes receiving a message 20 that includes an encrypted network slice identifier 26 (Block 700). The method also includes decrypting, or requesting decryption of, the encrypted network slice identifier 26 using cryptographic key material 22 that is available to the wireless device 12 from authentication 14 of the wireless device 12 with a home network 10H and that is shared between the wireless device 12 and the home network 10H (Block 710).

For example, where the serving network 10S is a visited network of the wireless device, said decrypting or requesting may comprise requesting decryption of the encrypted network slice 26 identifier by transmitting to the home network 10H a request that includes the encrypted network slice identifier 26. In this case, the method may further comprise receiving from the home network 10H a response to the request that includes a decrypted network slice identifier.

In other embodiments, where the serving network 10S is the home network 10H, said decrypting or requesting may comprise decrypting the encrypted network slice identifier 26.

In some embodiments, the method may further include selecting a network slice 10S-1 . . . 10S-N to serve the wireless device 12 based on the decrypted network slice identifier (Block 720).

Figure 8:
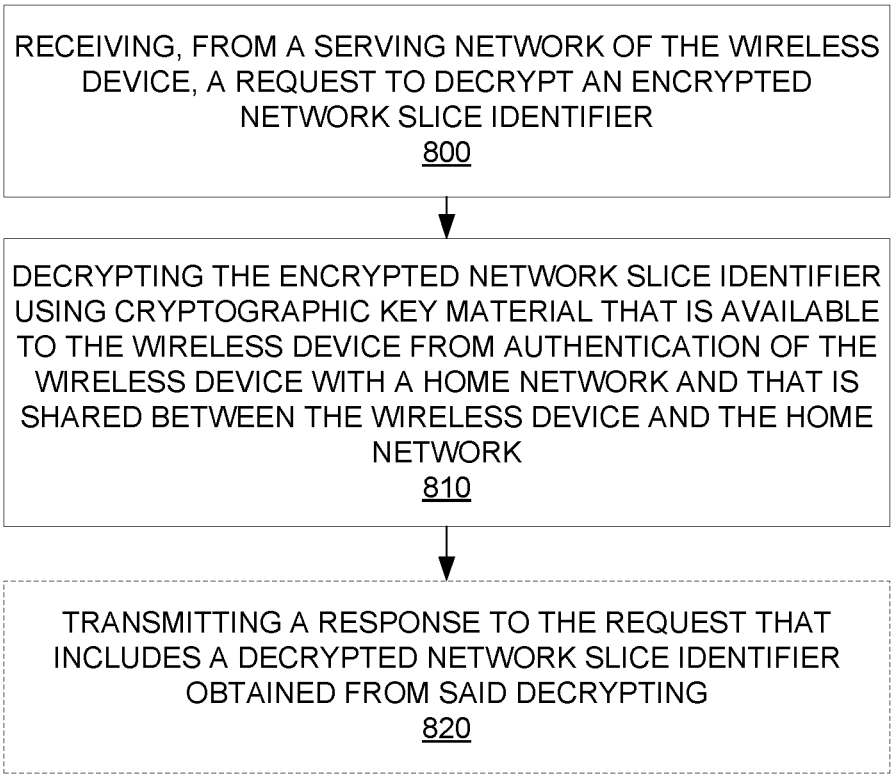
FIG. 8 is a logic flow diagram of a method performed by a network node in a home network of a wireless device according to some embodiments.

FIG. 8 depicts a method performed by a network node 18H in a home network 10H of a wireless device 12 in accordance with other particular embodiments. The method includes receiving, from a serving network 10S of the wireless device 12, a request to decrypt an encrypted network slice identifier 26 (Block 800). The method may also include decrypting the encrypted network slice identifier using cryptographic key material 22 that is available to the wireless device 12 from authentication 14 of the wireless device 12 with a home network 10H and that is shared between the wireless device 12 and the home network 10H (Block 810). The method in some embodiments further includes transmitting a response to the request that includes a decrypted network slice identifier obtained from said decrypting (Block 820).

In some embodiments, the method further comprises deriving the cryptographic key material 22. For example, this may entail directly deriving the cryptographic key material from a key $K_{AUSF}$ available from the authentication with the home network.

Embodiments herein also include corresponding apparatuses. Embodiments herein for instance include a wireless device configured to perform any of the steps of any of the embodiments described above for the wireless device.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 18S configured to perform any of the steps of any of the embodiments described above for the network node 18S.

Embodiments also include a network node 18S comprising processing circuitry and power supply circuitry. The processing circuitry is configured to perform any of the steps of any of the embodiments described above for the network node 18S. The power supply circuitry is configured to supply power to the network node 18S.

Embodiments further include a network node 18S comprising processing circuitry. The processing circuitry is configured to perform any of the steps of any of the embodiments described above for the network node 18S. In some embodiments, the network node 18S further comprises communication circuitry.

Embodiments further include a network node 18S comprising processing circuitry and memory. The memory contains instructions executable by the processing circuitry whereby the network node 18S is configured to perform any of the steps of any of the embodiments described above for the network node 18S.

Embodiments herein also include a network node 18H configured to perform any of the steps of any of the embodiments described above for the network node 18H.

Embodiments also include a network node 18H comprising processing circuitry and power supply circuitry. The processing circuitry is configured to perform any of the steps of any of the embodiments described above for the network node 18H. The power supply circuitry is configured to supply power to the network node 18H.

Embodiments further include a network node 18H comprising processing circuitry. The processing circuitry is configured to perform any of the steps of any of the embodiments described above for the network node 18H. In some embodiments, the network node 18H further comprises communication circuitry.

Embodiments further include a network node 18H comprising processing circuitry and memory. The memory contains instructions executable by the processing circuitry whereby the network node 18H is configured to perform any of the steps of any of the embodiments described above for the network node 18H.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
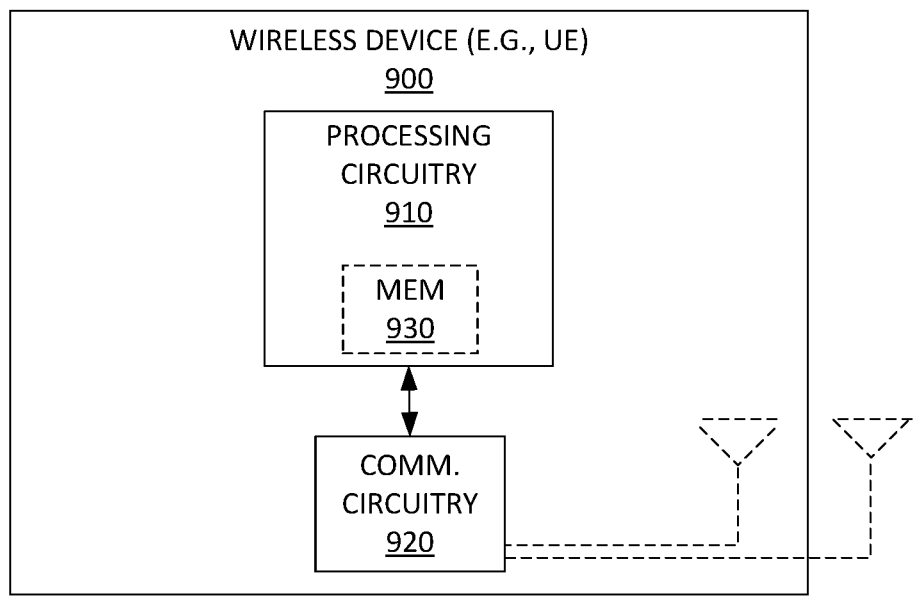
FIG. 9 is a block diagram of a wireless device according to some embodiments.

FIG. 9 for example illustrates a wireless device 900 (e.g., wireless device 12) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, e.g., in FIG. 6, such as by executing instructions stored in memory 930. The processing circuitry 910 in this regard may implement certain functional means, units, or modules.

Figure 10:
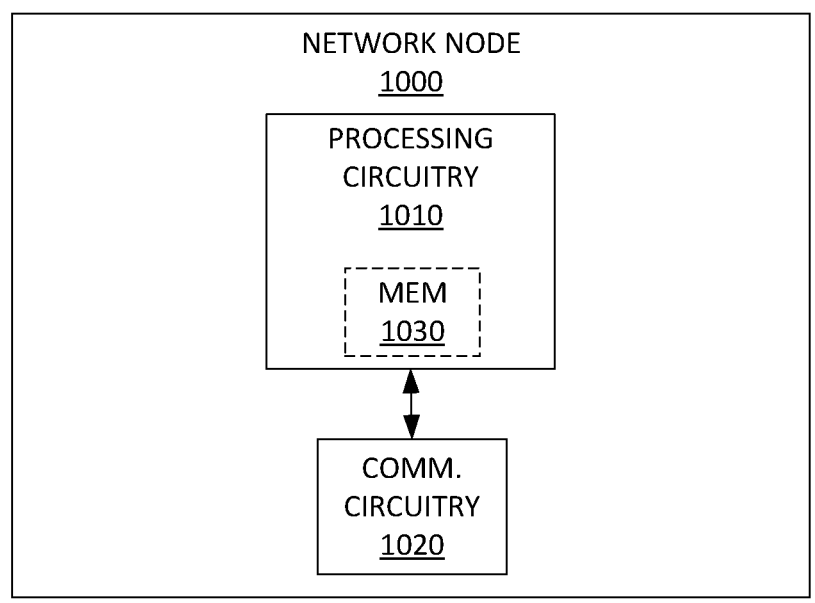
FIG. 10 is a block diagram of a network node according to some embodiments.

FIG. 10 illustrates a network node 1000 (e.g., network node 18S or network node 18H) as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, e.g., in FIG. 7 and/or FIG. 8, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 11:
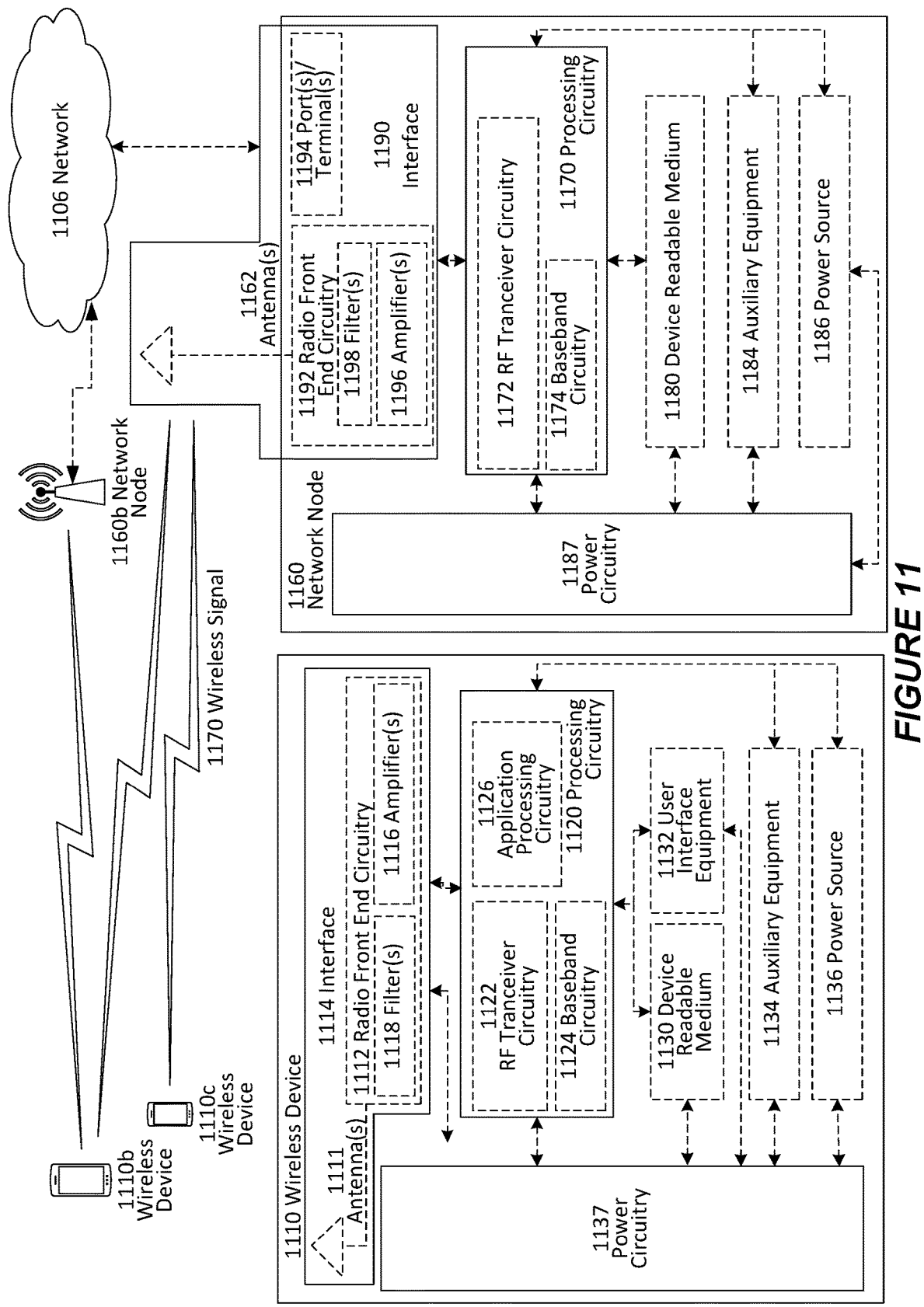
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
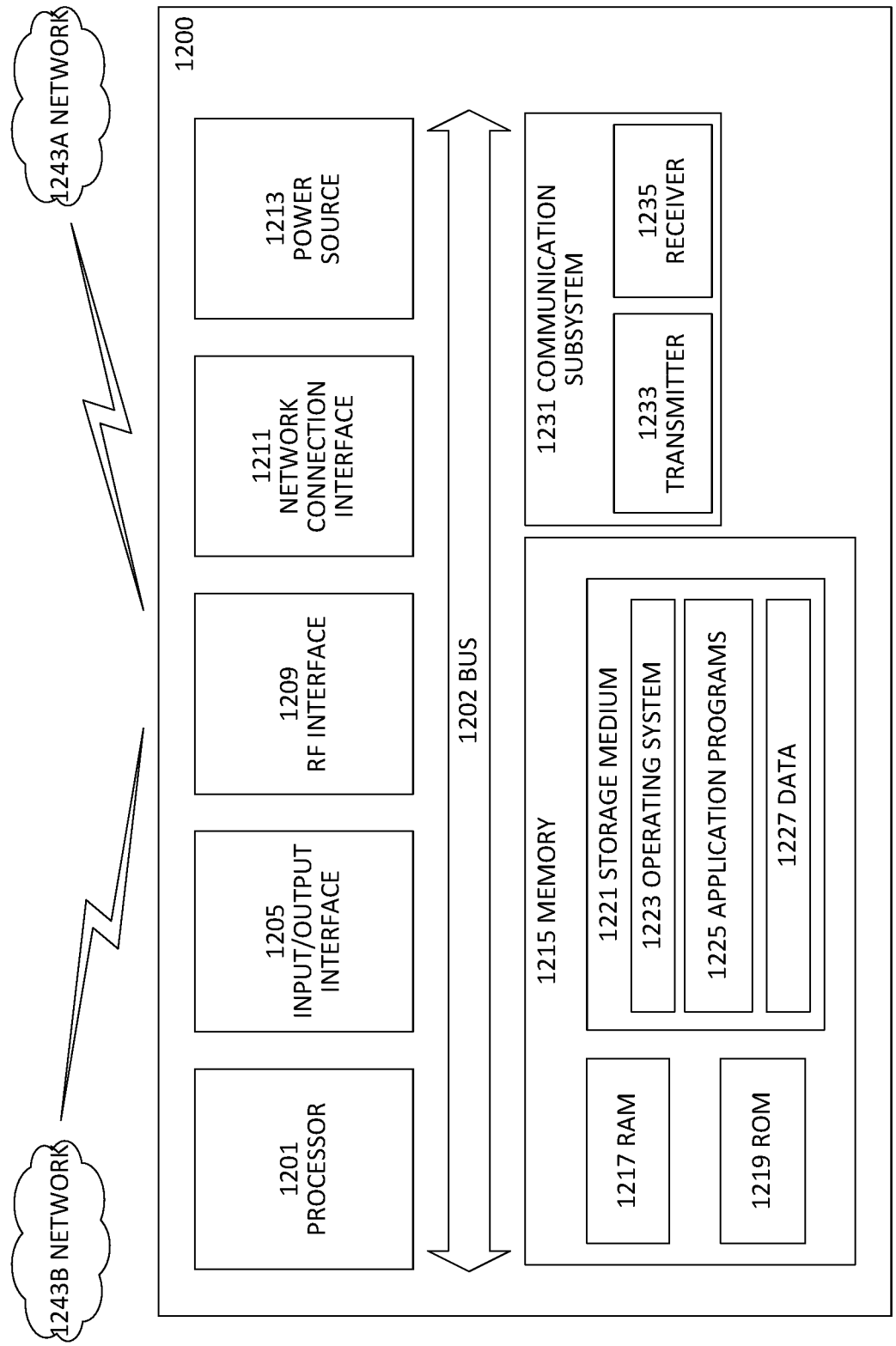
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
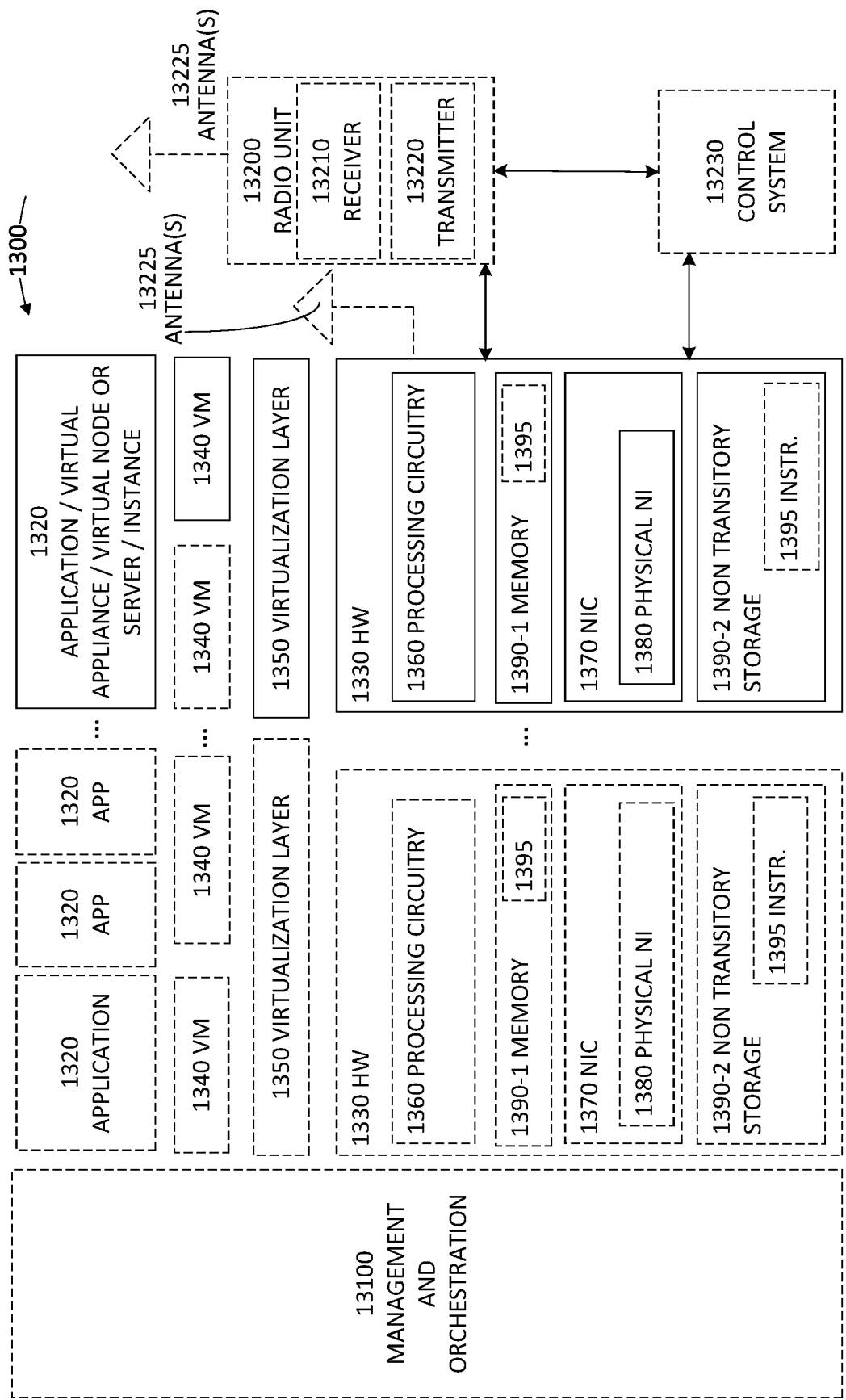
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
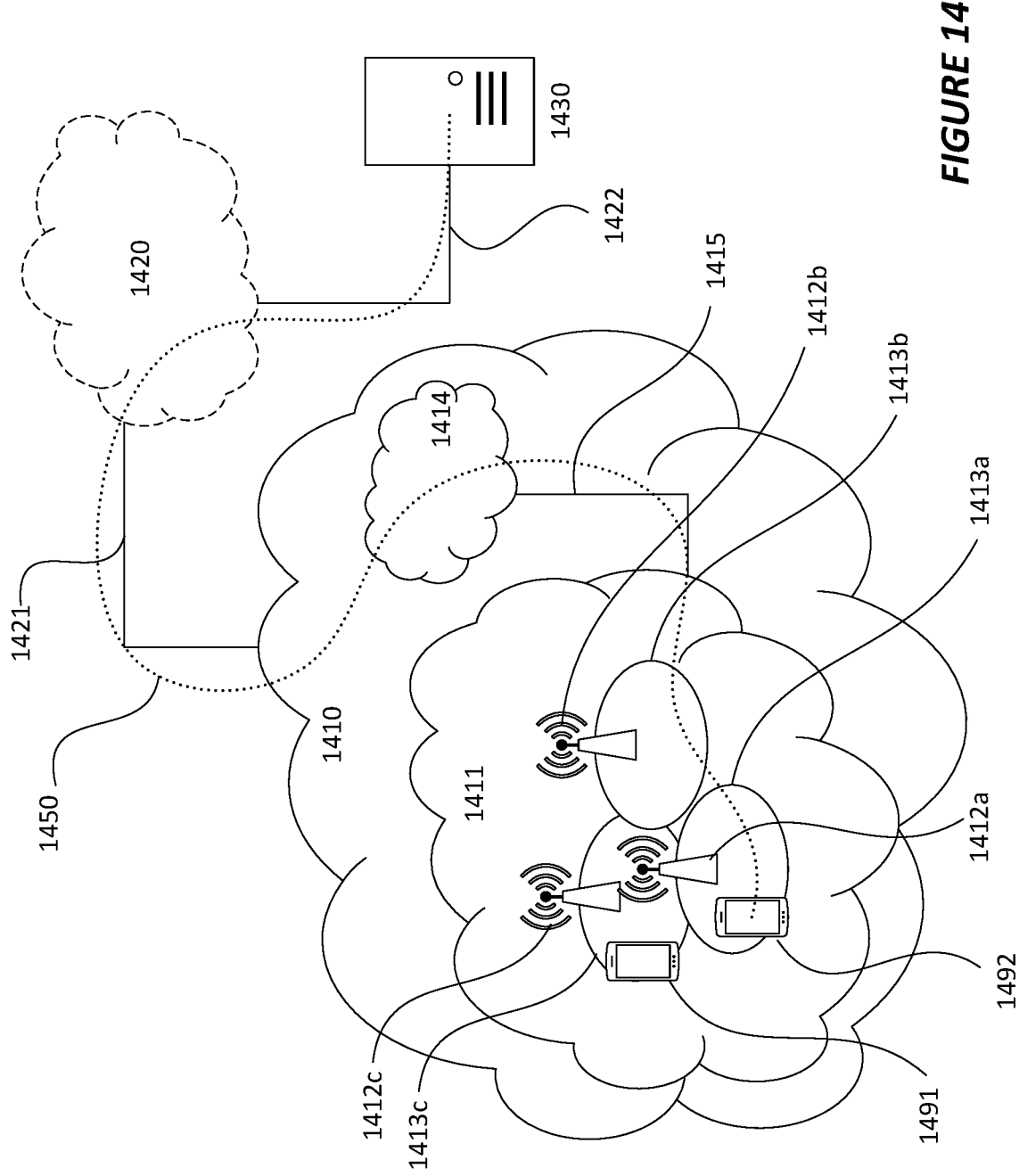
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
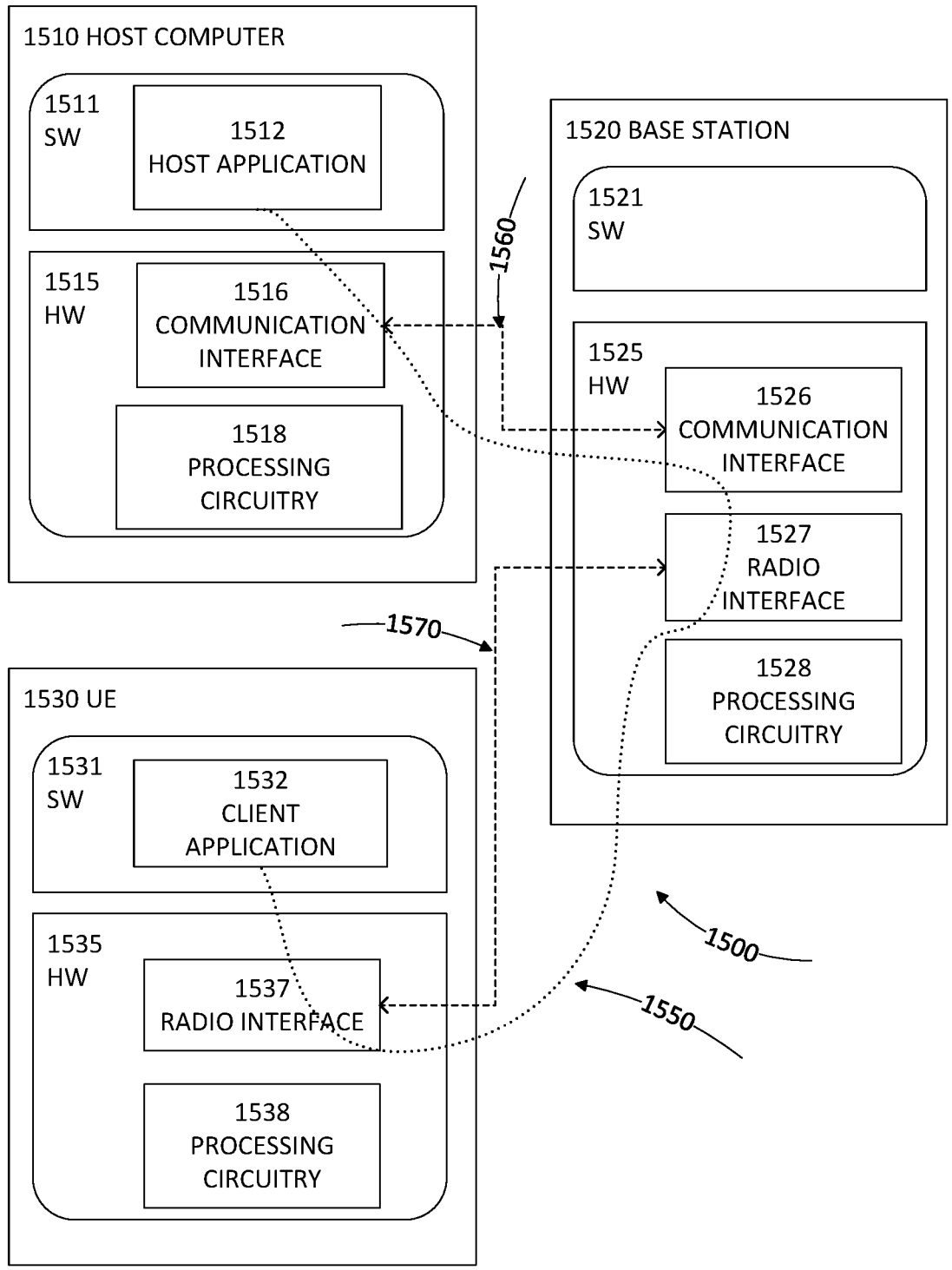
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
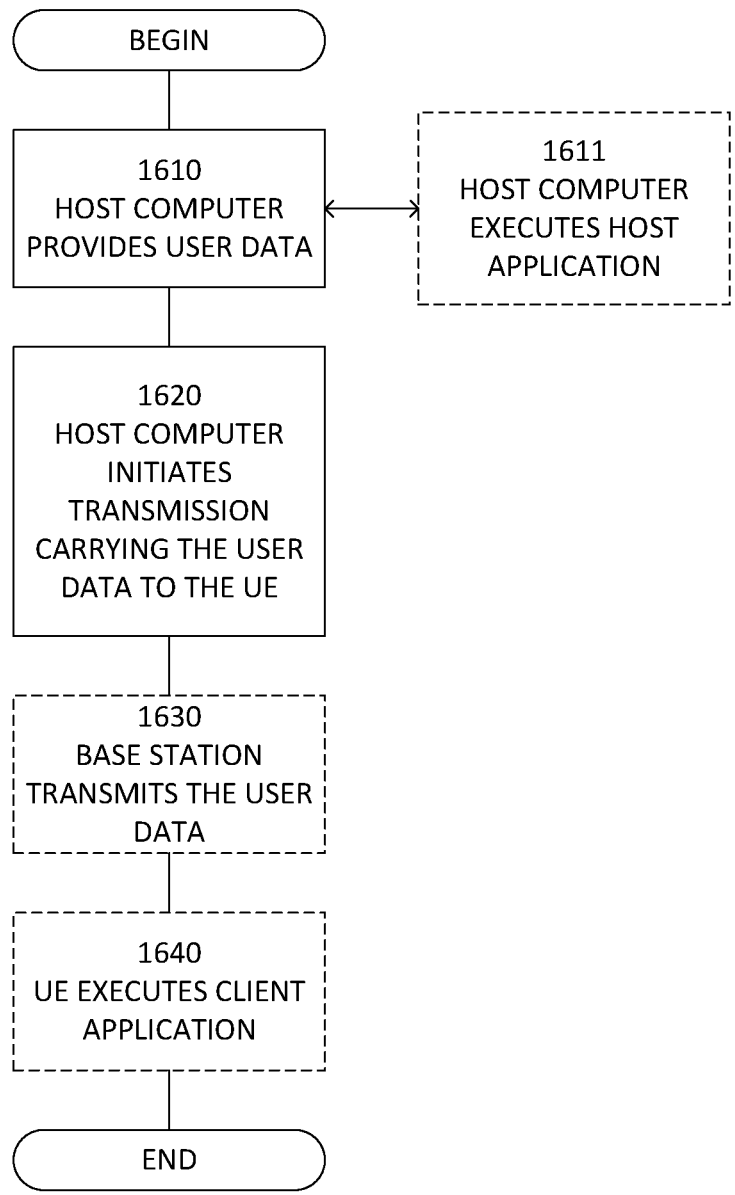
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
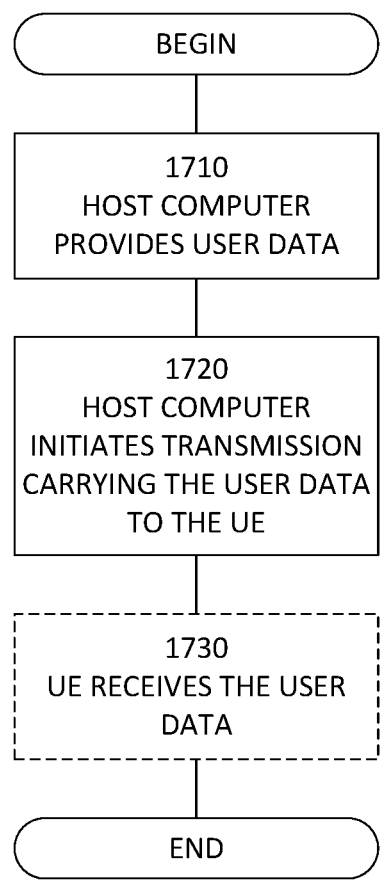
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
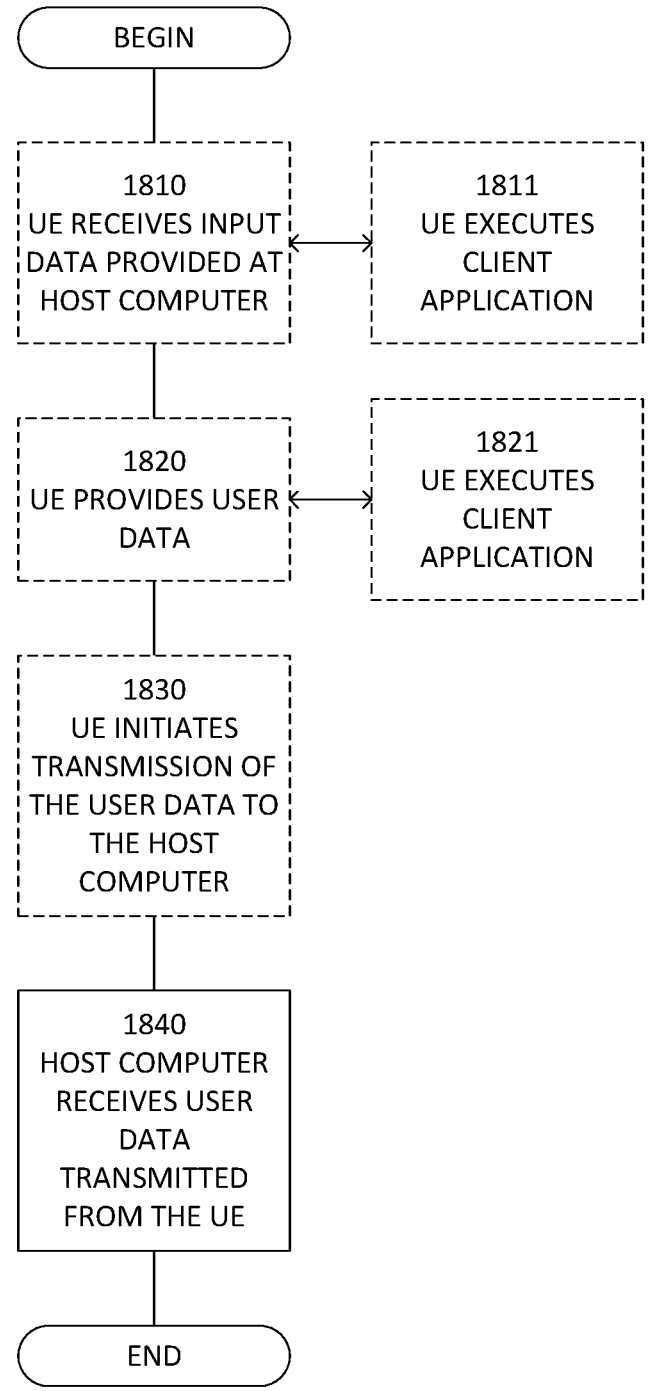
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
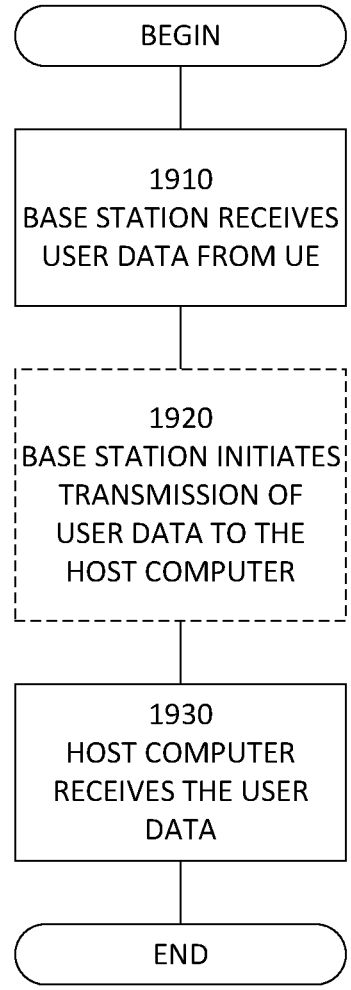
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a wireless device, the method comprising:
    performing authentication of the wireless device with a home network of the wireless device, by performing a run of an authentication procedure with the home network;
    encrypting a network slice identifier with cryptographic key material that is available from the authentication with the home network, that is shared between the wireless device and the home network, that is not shared with a visited network of the wireless device which is different than the home network, and that is bound to the run of the authentication procedure with the home network; and
    transmitting, to the visited network of the wireless device, a message that includes the encrypted network slice identifier,
    wherein the network slice identifier comprises Single Network Slice Selection Assistance Information (S-NSSAI), wherein the cryptographic key material includes a key $K_{NSSAI}$ dedicated for encrypting the network slice identifier, and wherein the method further comprises directly deriving the cryptographic key material from a key $K_{AUSF}$ available from the authentication with the home network, by deriving $K_{NSSAI}=KDF(Key, S)$, wherein KDF is a key derivation function, wherein Key is the key $K_{AUSF}$, and wherein S is a string comprising a concatenation of one or more input parameters and one or more respective lengths of the one or more input parameters.

2. The method of claim 1, wherein the home network is a 5G network.

3. The method claim 1, wherein the encrypted network slice identifier is included in an access stratum (AS) portion of the message or a non-access stratum (NAS) portion of the message.

4. A method performed by a network node in a visited network of a wireless device, wherein the visited network is different than a home network of the wireless device, the method comprising:
    receiving, by the network node in the visited network, a message that includes an encrypted network slice identifier;
    transmitting, to the home network of the wireless device, a request to decrypt the encrypted network slice identifier using cryptographic key material that is available to the wireless device from authentication of the wireless device with the home network, that is shared between the wireless device and the home network, that is not shared with the visited network of the wireless device, and that is bound to a run of an authentication procedure between the wireless device and the home network; and
    receiving, from the home network, a response to the request that includes a decrypted network slice identifier,
    wherein the network slice identifier comprises Single Network Slice Selection Assistance Information (S-NSSAI), wherein the cryptographic key material includes a key $K_{NSSAI}$ dedicated for encrypting the network slice identifier, and wherein the cryptographic key material is directly derived from a key $K_{AUSF}$ available from the authentication with the home network, wherein $K_{NSSAI}=KDF(Key, S)$, wherein KDF is a key derivation function, wherein Key is the key $K_{AUSF}$, and wherein S is a string comprising a concatenation of one or more input parameters and one or more respective lengths of the one or more input parameters.

5. The method of claim 4, further comprising selecting a network slice, or an access and mobility management function (AMF) to serve the wireless device based on the decrypted network slice identifier.

6. The method of claim 4, wherein the home network is a 5G network.

7. The method of claim 4, wherein the encrypted network slice identifier is included in an access stratum (AS) portion of the message or a non-access stratum (NAS) portion of the message.

8. A method performed by a network node in a home network of a wireless device, the method comprising:
receiving, from a visited network of the wireless device that is different than the home network, a request to decrypt an encrypted network slice identifier;
decrypting the encrypted network slice identifier using cryptographic key material that is available to the wireless device from authentication of the wireless device with the home network, that is shared between the wireless device and the home network, that is not shared with the visited network of the wireless device, and that is bound to a run of an authentication procedure between the wireless device and the home network; and
transmitting a response to the request that includes a decrypted network slice identifier obtained from said decrypting,
wherein the network slice identifier comprises Single Network Slice Selection Assistance Information (S-NSSAI), wherein the cryptographic key material includes a key $K_{NSSAI}$ dedicated for encrypting the network slice identifier, and wherein the method further comprises directly deriving the cryptographic key material from a key $K_{AUSF}$ available from the authentication with the home network, by deriving $K_{NSSAI}=KDF(Key, S)$, wherein KDF is a key derivation function, wherein Key is the key $K_{AUSF}$, and wherein S is a string comprising a concatenation of one or more input parameters and one or more respective lengths of the one or more input parameters.

9. The method of claim 8, wherein the home network is a 5G network.

10. A wireless device comprising:
communication circuitry; and
processing circuitry configured to:
perform authentication of the wireless device with a home network of the wireless device, by performing a run of an authentication procedure with the home network;
encrypt a network slice identifier with cryptographic key material that is available from the authentication with the home network, that is shared between the wireless device and the home network, that is not shared with a visited network of the wireless device which is different than the home network, and that is bound to the run of the authentication procedure with the home network; and
transmit, to the visited network of the wireless device, a message that includes the encrypted network slice identifier,
wherein the network slice identifier comprises Single Network Slice Selection Assistance Information (S-NSSAI), wherein the cryptographic key material includes a key $K_{NSSAI}$ dedicated for encrypting the network slice identifier, and wherein the processing circuitry is further configured to directly derive the cryptographic key material from a key $K_{AUSF}$ available from the authentication with the home network, by deriving $K_{NSSAI}=KDF(Key, S)$, wherein KDF is a key derivation function, wherein Key is the key $K_{AUSF}$, and wherein S is a string comprising a concatenation of one or more input parameters and one or more respective lengths of the one or more input parameters.

* * * * *